United States Patent
Hasan

(10) Patent No.: US 11,263,662 B2
(45) Date of Patent: Mar. 1, 2022

(54) SYSTEMS AND METHODS FOR AUTOMATIC HASHTAG EMBEDDING INTO USER GENERATED CONTENT USING MACHINE LEARNING

(71) Applicant: MESPOKE, LLC, Reston, VA (US)

(72) Inventor: S. Khurrum Hasan, Raleigh, NC (US)

(73) Assignee: MESPOKE, LLC, Reston, VA (US)

( * ) Notice: Subject to any disclaimer, the term of this patent is extended or adjusted under 35 U.S.C. 154(b) by 0 days.

(21) Appl. No.: 17/337,017

(22) Filed: Jun. 2, 2021

(65) Prior Publication Data
US 2021/0374797 A1    Dec. 2, 2021

Related U.S. Application Data

(60) Provisional application No. 63/033,438, filed on Jun. 2, 2020.

(51) Int. Cl.
| | |
|---|---|
| G06Q 30/02 | (2012.01) |
| H04L 12/58 | (2006.01) |
| G06N 20/00 | (2019.01) |
| G06Q 50/00 | (2012.01) |
| H04L 51/52 | (2022.01) |

(52) U.S. Cl.
CPC ......... *G06Q 30/0246* (2013.01); *G06N 20/00* (2019.01); *G06Q 30/0226* (2013.01); *G06Q 50/01* (2013.01); *H04L 51/32* (2013.01)

(58) Field of Classification Search
None
See application file for complete search history.

(56) References Cited

U.S. PATENT DOCUMENTS

| | | | |
|---|---|---|---|
| 10,475,084 B2 | 11/2019 | Stoliartchouk | |
| 10,535,080 B2 | 1/2020 | Jordan | |
| 10,692,103 B2 | 6/2020 | Hasan | |
| 2004/0193485 A1 | 9/2004 | Ilberg | |
| 2007/0043583 A1* | 2/2007 | Davulcu | G06F 16/951 705/1.1 |
| 2010/0185525 A1 | 7/2010 | Hazen | |

(Continued)

OTHER PUBLICATIONS

Barbosa et al., "Characterizing the effectiveness of twitter hashtags to detect and track online population sentiment." CHI '12 Extended Abstracts on Human Factors in Computing Systems. Association for Computing Machinery, New York, NY, USA, 2621-2626. Year: 2012 (Year: 2012).*

*Primary Examiner* — Christopher B Tokarczyk
(74) *Attorney, Agent, or Firm* — Polsinelli PC

(57) ABSTRACT

One or more aspects of the present disclosure are directed to a digital social medial platform configured to automatically identify and tag elements in an upload content using machine learning techniques. In one aspect, a method includes receive media content; automatically identify one or more elements and associated metadata in the media content using a machine learning technique; embed one or more hashtags within the media content, each of which corresponds to one of the one or more elements identified in the media content; publish the media content with the one or more hashtags; track engagements of one or more users with the media content having the one or more hashtag to yield a set of statistics; and generate a user-specific loyalty identifier for a user associated with the media content, based on the set of statistics.

20 Claims, 11 Drawing Sheets

(56) References Cited

U.S. PATENT DOCUMENTS

| | | |
|---|---|---|
| 2013/0013390 A1 | 1/2013 | Paulson-Ellis |
| 2013/0198002 A1 | 8/2013 | Nuzzi |
| 2013/0204703 A1 | 8/2013 | Carlson |
| 2014/0150029 A1 | 5/2014 | Avedissian |
| 2014/0241621 A1* | 8/2014 | Medvedovsky ......... G06K 9/46 382/159 |
| 2014/0278865 A1* | 9/2014 | Kumar ............... G06Q 30/0214 705/14.16 |
| 2015/0025979 A1 | 1/2015 | Box |
| 2015/0213411 A1* | 7/2015 | Swanson ............ G06Q 10/1095 705/301 |
| 2015/0248664 A1 | 9/2015 | Makhdumi |
| 2016/0012481 A1* | 1/2016 | Elvekrog ........... G06Q 30/0241 705/14.53 |
| 2016/0019579 A1 | 1/2016 | Sims |
| 2017/0078756 A1* | 3/2017 | Soon-Shiong ..... G06K 9/00744 |
| 2017/0115853 A1* | 4/2017 | Allekotte ........... G06K 9/00456 |
| 2017/0330357 A1 | 11/2017 | Siegel |
| 2018/0293601 A1 | 10/2018 | Glazier |
| 2018/0293603 A1* | 10/2018 | Glazier ................... H04L 67/22 |
| 2018/0314882 A1 | 11/2018 | Yu |

* cited by examiner

SYSTEMS AND METHODS FOR AUTOMATIC HASHTAG EMBEDDING INTO USER GENERATED CONTENT USING MACHINE LEARNING

RELATED APPLICATIONS

This Application claims priority to U.S. Provisional Application 63/033,438 filed on Jun. 2, 2020, the entire content of which is incorporated herein by reference.

TECHNICAL FIELD

The present technology pertains to systems and methods for a mobile-based and a web-based digital social media platform that enables embedding of hashtags in user-generated content uploaded to the digital social media platform and secure tracking of the embedded hashtags to create user-specific loyalty identifiers.

BACKGROUND

Technological advancements have led to the development of various types of digital social media platforms and their use in individuals' professional and personal lives is ever-expanding. Each new digital social media platform is developed with at least two main objectives, increased user retention and increased revenue generation from content providers. Furthermore, content providers compete for access to users of such digital social media platforms and this competition has forced them to devise various methodologies and schemes for reaching their intended audience.

For instance, many and almost all existing digital social media platforms enable their users to upload content/media to these digital social media platforms and allow each user to create hashtags for any number of elements present in the uploaded content. The user-created hashtags are then detected by backend algorithms and used as a basis for charging content providers associated with these hashtags. The backend algorithms are also used for providing the users of these digital social media platforms with targeted advertisements.

These methods of allowing users to create hashtags and using the hashtags as means for ultimate revenue generation for content providers and operators of digital social media platforms, leave the users who uploaded the content in the first place and created the hashtags) unappreciated and without any recognition for their contribution to the ultimate revenue generation for both content providers and operators of digital social media platforms. In other words, with hundreds of thousands of different content being uploaded to the various digital social media platforms available today, there is a vast pool of everyday individual users, whose efforts and time taken for uploading content to these platforms go unrecognized and unrewarded.

Furthermore, currently utilized hashtag creation and methods for tracking them, coupled with various other tools used by digital social media platforms to track and study their users' online footprints, interests, and likely purchases, present a significant breach of user privacy. Not only these methods inconvenience users by flooding them with targeted advertisements, but user privacy concerns continue to be a hotly debated topic. These factors are significant drivers behind many users terminating their social media accounts.

As another example of user reachability methods utilized by providers of digital social media platforms and content providers, many content providers retain, and in many instances, expend significant capital on celebrities and popular figures (social media influencers) with a large base of followers to advertise their products to their followers on these digital social media platforms. However, reliance on social media influencers are economically inefficient for content providers and at the same time prevents creators and owners of digital social media platforms to maximize their revenue Accordingly, there is a need for an improved digital social media platform that addresses, among many other existing shortcomings, at least the above deficiencies of currently available digital social media platforms.

SUMMARY

Example embodiments are provided for addressing one or more deficiencies of digital social media platforms, as described above. More specifically, mobile-based and web-based digital social media platforms are disclosed herein that improve the functionality, usability, and security of existing social media platforms. For example, digital social media platforms disclosed herein leverage artificial intelligence and computer vision techniques for automatic creation and embedding of hashtags, at a backend processing component of the disclosed digital social media platform, for user-generated content. The digital social media platform further enables tracking the embedded hashtags to create an objective user-specific loyalty identifier (may also be referred to as user-specific identifier) that is indicative of each user's (each content creator that uploads content to the social media platform) value and level of influence within communities of users (social capital score) with which the user (content creator) is associated. The objective user-specific identifier may then be redeemed by the respective user in the form of discounts, promotions, coupons, digital rewards, etc.

In some examples, user-generated content may be obtained when each user uploads a particular media content such as photographs, videos, etc., on his or her account on example digital social media platforms of the present disclosure. As will be described below, computer vision and trained machine learning models deployed at a backend processor, may automatically detect and tag one or more items in the uploaded user-generated content. Each tag may identify information such as the type of the detected item, the brand of the item, a category of the item, etc. A user may also be referred to as a content creator and thus the two terms may be used interchangeably throughout the present disclosure.

Backend processors of example digital social media platforms of the present disclosure may then convert the tagged items into hashtags embedded within the corresponding user-generated content. The user-generated content with the embedded hashtags may then be uploaded to the digital social media platform and be made available for viewing within virtual communities of users on the digital social media platform, grouped based on the embedded hashtags and/or the provided metadata. The embedded hashtags and users' interactions therewith may be tracked and each interaction (e.g., view, click, purchases made via the hashtags, etc.) may result in points being assigned to the content creator who provided the user-generated content. These points, among other factors, may be used to create a user-specific loyalty identifier for each content creator, redeemable in the form of coupons, discounts, promotions, etc. at one or more sites (virtual or physical) associated merchants, retailers, service providers, etc.

In one aspect, a method includes receiving media content; automatically identifying one or more elements and associated metadata in the media content using a machine learning technique; embedding one or more hashtags within the media content, each of which corresponds to one of the one or more elements identified in the media content; publishing the media content with the one or more hashtags; tracking engagements of one or more users with the media content having the one or more hashtags to yield a set of statistics; and generating a user-specific loyalty identifier for a user associated with the media content, based on the set of statistics.

In another aspect, the one or more elements are identified using a computer-vision technique, the computer vision technique utilizing a trained machine learning model to detect the one or more elements.

In another aspect, the associated metadata are identified using a trained machine learning model, the trained machine learning model using at least information on historical trends of a user associated with the media content to automatically identify the associated metadata for each identified one of the one or more elements.

In another aspect, tracking the engagements is triggered when the one or more users selects an element with an embedded hashtag within the media content having the one or more hashtags.

In another aspect, the engagements are a plurality of interactions with the media content having the one or more hashtags, the plurality of interactions including viewing the media content with the one or more hashtags, visiting a website of a brand or a retailer associated with an element in the media content having an embedded hashtag, purchasing at least one product from the website, and purchasing a same or similar product as the element in the media content.

In another aspect, each of the plurality of interactions has a corresponding number of loyalty point.

In another aspect, the method further includes updating a corresponding loyalty points number for the user based on the tracking.

In another aspect, the method further includes generating the user-specific loyalty identifier as a weighted combination of a plurality of factors.

In another aspect, the method further includes generating a computer-readable tag associated with the user, based on the user-specific loyalty identifier, the computer-readable tag being for retrieving one of discounts, coupons and promotions at one or more merchants.

In one aspect, a digital social media platform includes a plurality of end terminals configured to provide a corresponding user access to the digital social media platform; and a processing center communicatively coupled to each of the plurality of end terminals and configured to: receive media content; automatically identify one or more elements and associated metadata in the media content using a machine learning technique; embed one or more hashtags within the media content, each of which corresponds to one of the one or more elements identified in the media content; publish the media content with the one or more hashtags; track engagements of one or more users with the media content having the one or more hashtag to yield a set of statistics; and generate a user-specific loyalty identifier for a user associated with the media content, based on the set of statistics.

In another aspect, the digital social media platform is a Software-as-a-Service platform to which one or more merchants can subscribe.

In another aspect, one or more non-transitory computer-readable media comprising computer-readable instructions, which when executed by one or more processors, cause the one or more processors to receive media content; automatically identify one or more elements and associated metadata in the media content using a machine learning technique; embed one or more hashtags within the media content, each of which corresponds to one of the one or more elements identified in the media content; publish the media content with the one or more hashtags; track engagements of one or more users with the media content having the one or more hashtag to yield a set of statistics; and generate a user-specific loyalty identifier for a user associated with the media content, based on the set of statistics.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
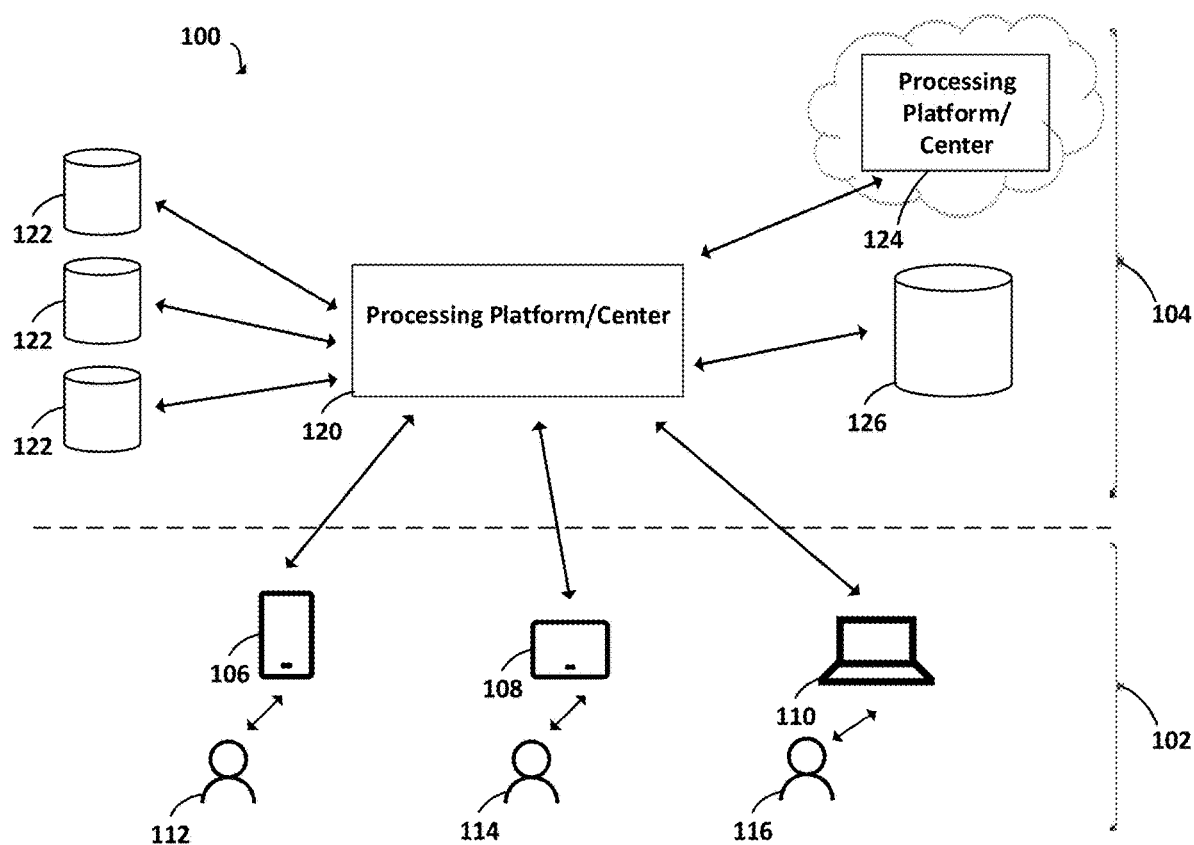
FIG. 1 shows an example system for providing a digital social media platform, according to one aspect of the present disclosure.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

Social media platforms are more prevalent and ever more present in people's daily lives. They are used by hundreds of millions of users throughout the world for connecting with their friends and loved ones, sharing their stories and what matters to them with the world through media content or words uploaded to their profile, for obtaining their news and information, for shopping, among others. At the same time, social media platforms provide retailers and brands (anyone with a product or service to sell) unique access to the users without requiring them to leave the comfort of their homes to sell their products to them at a touch of a finger.

With the benefits of existing social media platforms (both for users and retailers and brands) come several shortcomings that need to be addressed. For example, content creators on social media platforms are required to go through a number of manual steps to properly tag their content before sharing them with their connections online. Moreover, instead of content creators being rewarded for the content they upload, hashtags created by the content creators are used by the social media platforms as measures for pushing advertisements to users and as a benchmark by which social media platforms charge brands and retailers for advertising their products on their social media platform. Lastly, the reachable audience for each brand and retailer is limited, which is why the prevalent practice is for brands and retailers to hire expensive social medial "influencers" and "celebrities" to promote their products and brands. These and other shortcomings of existing social medial platforms are addressed by systems and methods of the present technology, as described below.

The disclosed technology addresses the need in the art for an improved digital social media platform that provides an automatic creation and embedding of hashtags into media content uploaded to a profile of a user on the improved digital social media platform via an end terminal. The hashtags are automatically generated for an uploaded media content using trained machine learning models and/or computer vision techniques. The hashtags may be embedded within the uploaded media content and be published for others to interact with. Other users' interactions and engagements with the embedded hashtags will then be tracked to create unique loyalty identifier for each user indicative of each user's social influence (social capital score). Example embodiments of the improved digital social media platform of the present disclosure further allow such unique loyalty identifiers to be translated (converted) into various commercial discounts, promotions, etc. for each respective user.

Example digital social media platforms of the present application can provide the following exemplary advantages. For example, by utilizing trained machine learning models and artificial intelligence, example digital social media platforms of the present disclosure can eliminate the process of requiring manual identification of items and associated metadata by the content creators for purposes of generating and embedding hashtags into user-generated content. This automated process not only improves the usability and functionality of the digital social medial platform relative to existing systems, but it also improves the efficiency of network and resource utilization. Interaction with content creators to receive information and metadata on items for purposes of creating and embedding hashtags into contents requires additional signaling and data processing steps, which the auto-tagging process disclosed herein eliminates.

Furthermore, additional improvement to the functioning of digital social media platforms is provided by systems and methods disclosed herein by providing an objective and algorithmic determination of a value for each content creator and allowing them to be rewarded for their social media activities. As another example, the disclosed digital social media platform offers improved security and privacy whereby targeted advertisements can be eliminated and tracking of users' online activities may be prevented. As a further advantage and in contract to existing digital social media platforms, content providers that utilize the example digital social media platforms of the present disclosure, no longer need to rely and expend significant capital on retaining celebrities and popular social figures for advertising their products, while being limited to the reach of a single or a handful of celebrities that may agree to collaborate with them. Instead, the disclosed digital social media platform of the present disclosure enable content provides an added functionality to content creators to harness the power of individual users as promoters and champions of their products and brands on the digital social media platform to reach their respective connections and, in aggregate, promote their products and brands to a significantly higher number of potential customers that would otherwise be unreachable when only a single or a handful of expensive celebrities are relied upon.

In some examples, the disclosed technology is a Software-as-a-Service (SaaS) platform with both web and mobile platforms to which retailers and brands (may be referred to as merchants) may subscribe. Content creators, using their mobile or web portal, may create and upload their media content (user-generated content) to be automatically tagged, embedded with corresponding hashtags, and published for others to interact with (and the content creator being rewarded for such interactions, as will be described). Merchants, using their admin portal, can subscribe to services provided by the social medial platform of the present technology, set parameters and conditions for converting user-specific loyalty identifiers to rewards for their products, view and track various statistics on users' interaction with their brand, corresponding product conversion rates, etc.

The disclosure begins with a description of an example digital social media platform from a content creator perspective. With reference to FIGS. 1-9, example processes are described for automatic detection and tagging of items in medial content uploaded by content creators, generating and embedding of hashtags in the media content before publishing the same on the social media platform for other users to interact with, tracking other users' interactions with the hashtags in the published content for assigning user-specific loyalty identifiers to content creators, and presenting various statistics on the tracked interactions to the content creators.

The disclosure will then continue with an example description of system architectures that may be utilized to implement any one component of the digital social media platform of the present disclosure. The disclosure then concludes with a description of one or more example implementations of the digital social media platform of the present technology as a SaaS model with reference to FIG. 11

FIG. 1 shows an example system for a digital social media platform, according to one aspect of the present disclosure. System 100 of FIG. 1 may include a frontend platform 102 and a backend platform 104.

Front end platform 102 may be formed of one or more end terminals (user terminals) 106, 108, and 110 each of which may be associated with a corresponding one of users 112, 114, and 116, respectively.

End terminals 106, 108, and 110 may be any type of known or to be developed computing device capable of downloading computer-readable instructions/applications for a digital social media platform and communicating with backend platform 104 using known or to be developed wired and/or wireless communication schemes. For example, each of end terminals 106, 108, and 110 can be a mobile phone, a tablet, a laptop, a personal digital assistant, a desktop computer, etc. In one example, each of end terminals 106, 108, and 110 can be capable of or be equipped with media capturing components such as a camera for taking photographs and/or videos for uploading and posting to the digital social media application available on the end terminals 106, 108, and 110, as will be described below. In some examples, end terminals 106, 108, and/or 110 may not necessarily have computer-readable instructions/applications for a digital social media platform installed thereon but may instead access the digital social media platform through a web browser of end terminal 106, 108, and/or 110. Moreover, end terminals 106, 108, and/or 110 may not necessarily be equipped with media capturing components but instead may have necessary functionalities and features for received captured media content and uploading the same to the digital social media platform via a web browser, installed digital social media platform application, etc.

While FIG. 1 illustrates only three end terminals 106, 108, and 110, the present disclosure is not limited thereto and there may be more or less end user terminals such as hundreds, thousands or millions of end terminals via which users can access (e.g., through a web browser or downloaded application of the digital social media platform), subscribe to and use digital social media platform provided by processing center or back end of system 100.

Backend platform 104 may include components including, but not limited to, a processing platform/center 120. Processing center 120 may have one or more memories storing computer-readable instructions, which may be performed by one or more associated processors to implement functionalities that will be described herein. Processing center 120 may also be referred to, throughout the present disclosure, as provider or platform operator 120.

Processing center 120 can provide a downloadable computer-executable application to any one or more of end terminals 106, 108 and 110.

Processing center 120 can have one or more associated databases such as databases 122. The number of databases 122 is not limited to three as shown in FIG. 1 and can be more or less depending on system requirement of system 100, resource consumptions and required resources to service end users and handle network traffic, etc. Databases 122 can be used for storing user profiles, user-generated content, unique loyalty identifiers of users, etc., all of which will be described below in more detail.

Processing center 120 can communicate with databases 122 using any known or to be developed wired and/or wireless scheme. Furthermore, processing center 120 and/or databases 122 can be cloud-based and hosted on one or more private, public, and/or hybrid cloud structures that may be created and owned by the owner and operator of processing center 120 and/or can be provided by third-party cloud service provider. While FIG. 1 illustrates a single processing center 120, the present disclosure is not limited to and processing center 120 may be implemented in a distributed manner using a network of connected servers to meet processing demands for processing interactions and communication with end terminals and/or other backend components.

Processing center 120 can further be communicatively coupled to one or more external databases and processing centers such as processing center 124 and/or database 126. Processing center 124 and/or database 126 may belong to independent and third-party content providers such as retailers, producers, and sellers of commercial products in various industries such as clothing industry, fashion industry, cosmetics industry, home products, car manufacturers, food industry, entertainment services and content producers, travel services, etc. In one or more examples, database 126 may be a third-party computer vision database utilized by machine trained models of the present disclosure for automated identification and tagging of items in user-generated content uploaded to the digital social media platform.

Number of databases and processing centers for independent and third-party content providers is not limited to processing center 124 and/or database 126 shown in FIG. 1 but may be more or less. In one example, processing center 120 may enter into agreements with operators of processing center 124 and/or database 126 such that various metadata collected and tracked by processing center 120 and used for generating unique loyalty identifiers for users can be exchanged with the third-party content providers for possible coupons, promotions, etc., redeemable at such third-party content providers by corresponding users, as will be described below.

Processing center 120 can be communicatively coupled to processing center 124 and/or database 126 via any known or to be developed wired and/or wireless scheme. Processing center 124 and/or database 126 may be cloud-based.

As noted above, processing center 120 can provide a downloadable set of instructions (a downloadable application) to each end terminal 106, 108 and/or 108. Once downloaded, corresponding one of users 110, 112 and/or 114 can post media (e.g., video, audio, photographs) and provide various metadata associated with the posted media. The user-generated content (posted media and associated metadata) may then be processed by the digital social media platform for hashtag embedding and be accessible to followers and other users having profiles on the digital social media platform. Processing center 120 may then track the followers and other's users online activities stemming from (based on) user-generated content and determine/calculate loyalty identifiers for the corresponding one of users 110, 112 and/or 114, which may then be redeemable in the form of discounts, promotions, etc. at various merchants, retailers, etc. These set of functionalities will be described in more detail below.

Various example screens of the downloaded application for the digital social media platform will be described with reference to FIGS. 2-7. For ease of discussion, FIGS. 2-7 will be described with reference to end terminal 106 and corresponding user 112 and account of user 112 with the digital social media platform accessed via end terminal 106, however FIGS. 2-7 are applicable to any other user and end terminal via which the digital social media platform is accessed.

Figure 2:
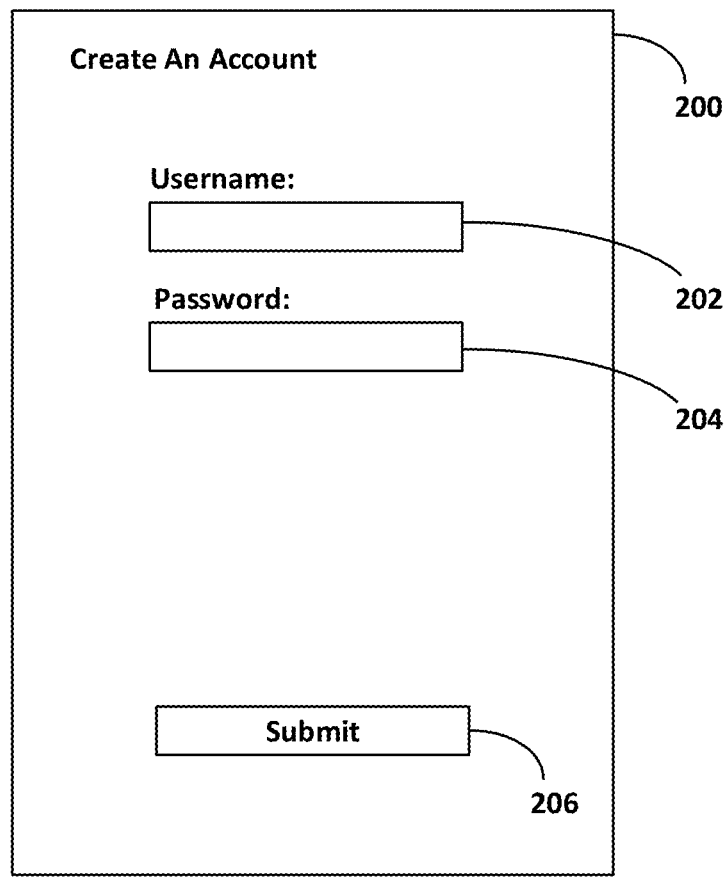
FIG. 2 illustrates an example screen of a digital social media platform, according to one aspect of the present disclosure.

FIG. 2 illustrates an example screen of a digital social media platform, according to one aspect of the present disclosure. Screen 200 may appear on end terminal 106 once the application is downloaded by user 112 on end terminal 106. Screen 200 may prompt user 112 to create an account by providing a username in command field 202 and a password in command field 204. Thereafter, user 112 may hit submit button 206 (e.g., a virtual submit button 206). In response, processing center 120 may process the entered information to determine if the entered username and password are valid. If not, user 112 may be prompted to re-enter a new username and/or password. Alternatively, when digital social media platform is accessed via a web browser (i.e. without a specific application downloaded on end terminal 106), screen 200 may appear on the web browser prompting user 112 to create an account and thereafter use the established credentials to log into their profile on the digital social medial platform.

Once authorized and approved, user 112 may login to the application (or access the digital social media platform via a web browser) or may be automatically logged in, every time user 112 starts the application on end terminal 106. Optionally, user 112 may opt in to automatically log into the digital social media platform application on end terminal 106 every time the application is selected and run on end terminal 106.

Figure 3:
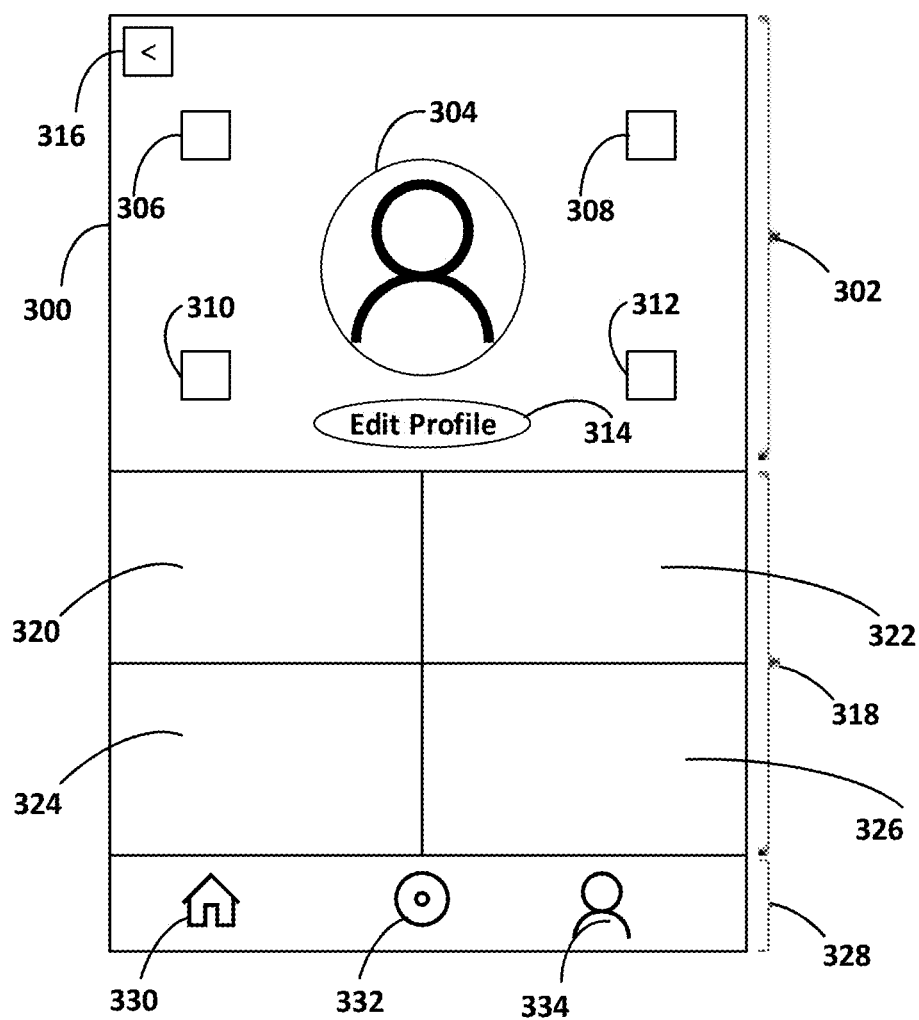
FIG. 3 is an example screen of a user's profile page on a digital social media platform, according to one aspect of the present disclosure.

FIG. 3 is an example screen of a user's profile page on a digital social media platform, according to one aspect of the present disclosure Screen 300 may be a profile page of user 112 associated with end terminal 106. Upon logging into the digital social media platform, each user may be taken to his or her profile page similar to screen 300. Screen 300 may be appropriately adjusted depending on whether user 112 accesses the digital social media platform via a downloaded application on end terminal 106 or via a web browser. Regardless, the content available to user 112 may be the same or substantially the same as that shown in screen 300.

Screen 300 may have several sections. Section 302 may provide an overview of user 112's statistics and optionally his or her profile picture (profile identifier) 304. As shown in section 302, in addition to profile picture 304, four exemplary statistics (user-specific indicators) in association with user 112 appears. Such user-specific indicators may be indicative of user 112's activities, postings, and engagement of other users with media content posted/shared by user 112 on the digital social media platform, as will be described below.

Example statistics include loyalty statistics 306. Exemplary methodologies according to which user 112 accrues loyalty points based on embedded hashtags created for content uploaded by user 112 to the digital social media platform, will be described below. As an overview, a user may accrue certain number of points every time another user views, clicks, shops using embedded hashtags in media content uploaded by user 112.

Another example statistic may be referred to as tags statistic 308, which may be referred to as DNA tag 308. Tags statistic 308 may indicate a total number of tags and metadata specified for media content uploaded to profile of user 112 on the digital social media platform. For example, an element of an example media content uploaded to profile of user 112, may be a clothing item. Metadata associated with the clothing item may include associated category, brand, and optionally a retailer. By entering information for each of the example metadata (e.g., 3 in this example), an existing tags statistic 308 for user 112 may be increased by one for each piece of information (e.g., 3 in this example, and the change may be reflected as an updated tags statistic 308.

Another example statistic may be referred to as view statistic 310, which may also be referred to as Foto Shop 312, reflecting how many shops, views, clicks have resulted from an embedded hashtag(s) of a particular media content uploaded to the profile of user 112. For example, each time an embedded hashtag into a particular item is accessed, viewed, clicked on and/or ultimately resulted in another user purchasing the same item, another similar item in the same category, another item from the same brand, and/or another item from the same retailer, view statistic 310 for user 112 may change (increase) and the change may be reflected as an updated view statistic 310.

Another example statistic may be network statistic 312, which may also be referred to as tribe statistic 312. Network statistic 312 may simply reflect a total number of connections (e.g., friends, contacts) with profiles followed by user 112 and/or are following profile of user 112 on the digital social media platform.

Section 302 may further include an edit profile option 314 which may be a virtual button that a user may click to access and edit profile of user 112 on the digital social media platform.

FIG. 3 also illustrates a virtual button 316 at top left corner of screen 300, which may be a shortcut that persists through various screens of the social media platform of the present disclosure. Virtual button 316 may allow access (quick shortcuts) to user 112's profile, favorite brands, option to search for particular user profiles, access to user-specific loyalty identifier (social capital score), and option to sign out/terminate profile, all of which will be described below with reference to FIG. 4. As noted, virtual button 316 may persist through many (and/or every) different screen or page of digital social media platform, when user 112 logs into and browses the digital social media platform.

Screen 300 further includes section 318, which may be formed of (and continuously updated with) media content uploaded to user profile of user 112. As shown, section 318 includes an example of four tiles 320, 322, 324, and 326. Each of tiles 320, 322, 324, and 326 may correspond to a different media content uploaded to user profile of user 112. As more and more media content is uploaded to user profile of user 112, section 318 may become scrollable so that all uploaded content may be scrolled through, viewed, and accessed, as desired.

Screen 300 also includes section 328. Section 328 may include 3 example virtual buttons. First example virtual button may be a home button 330, which may link to a home page (e.g., brand community) associated with media content uploaded to user profile of user 112. This will be further described below with reference to FIG. 6.

Section 328 may further include media capturing button 332. Media capturing button 332 can active media capturing tools of end terminal 106 (e.g., a camera, a microphone, etc.) for user 112 to capture and record media content for uploading to his or her profile on the digital social media platform. Media capturing button 332 can alternatively allow user 112 to select already captured media content stored on end terminal 106 for uploading to the digital social media platform. Profile button 334 may take user 112 to another screen for editing his or her social media profile as will be described below with reference to FIG. 4.

While not shown, captured media content or an already existing media content selected for upload may be edited prior to uploading using various filters, zooming functions made available to users by provider of the digital social media platform of the present disclosure.

Section 328 may further include a user profile button 334, which when selected may take a viewer or user 112 back to user profile of user 112 shown in example screen 300.

In one example, section 328 may persist through every possible and different screen or view of the digital social media platform similar to virtual button 316. While section 328 is shown as having only three virtual buttons for accessing different components or sections/pages associated with digital social media platform of the present disclosure, the number of virtual buttons is not limited to three and may be more or less. In one example, virtual button 316 may also be included in section 328.

Figure 4:
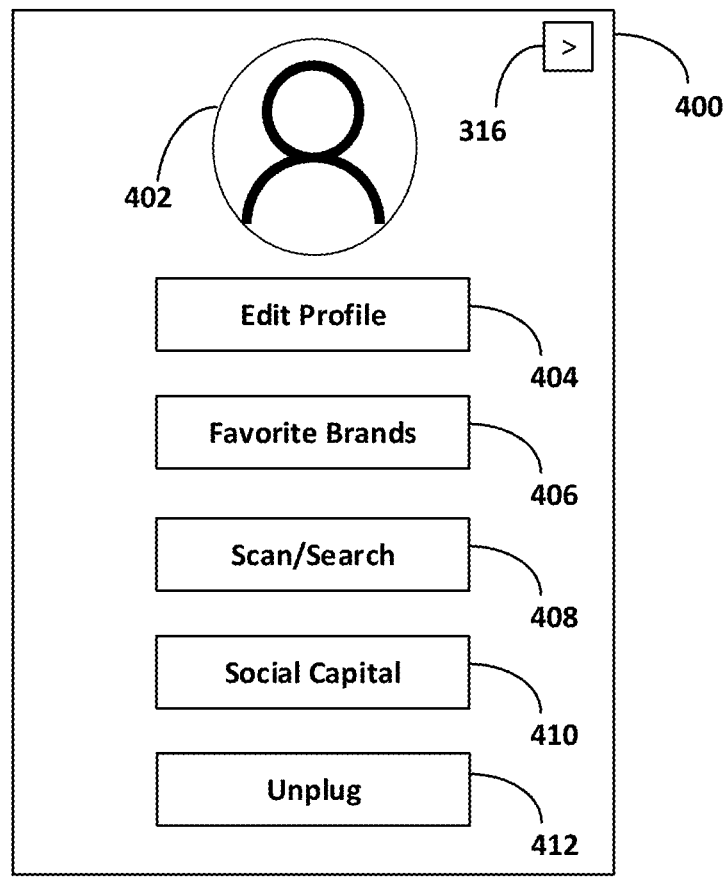
FIG. 4 is an example screen of a user's profile page on a digital social media platform, according to one aspect of the present disclosure.

FIG. 4 is an example screen of a user's profile page on a digital social media platform, according to one aspect of the present disclosure. Screen 400 illustrates an example page that may appear on end terminal 106 when virtual button 316 is activated. Screen 400 may be appropriately adjusted depending on whether user 112 accesses the digital social media platform via a downloaded application on end terminal 106 or via a web browser. Regardless, the content available to user 112 may be the same or substantially the same as that shown in screen 400.

As described above, virtual button 316 may allow access (quick shortcuts) to user 112's profile, favorite brands, option to search for particular user profiles, access to user-specific loyalty identifier (social capital score), and option to sign out/terminate profile.

As shown in FIG. 4, screen 400 may include profile picture 402, which may be the same as profile picture 304 of FIG. 3. Virtual button 316 may also be accessible via screen 400 for allowing user 112 to access a previously visited page or screen of the digital social media platform, from which screen 400 was accessed via virtual button 316.

Screen 400 further includes option (button) 404, via which user 112 may access and/or edit various pieces of personal information such as name, address, age, etc. that may be viewable by other users on the digital social media platform. Screen 400 further includes option (button) 406 that may allow user 112 to edit his or favorite brands, products, retailers, merchants, etc. (identified favorite brands, products, retailers, merchants, etc. can influence media content displayed on a home page of user 112 on end terminal 106, as will be described below).

Screen 400 further includes option (button) 408 that may allow user 112 to scan the digital social media platform for other postings and users based on various filtering criteria that may be specified by user 112. Screen 400 further includes option (button) 410 that may allow user 112 to view his or her user-specific identity (user-specific social capital), which may be embodied as a barcode, a two-dimensional computer-readable code (QR code), etc., that can be scanned for redeeming in terms of coupons, promotions, discounts, etc., at relevant merchants, as will be described more fully below. Screen 400 further includes option (button) 412 that may allow logging out of user profile of user 112, deactivating (unplugging) user profile of user 112 on the digital social media platform, etc.

As noted above, user 112 may wish, from time to time, to upload various media content onto his or her profile on the digital social media platform of the present application. Such media content maybe a photograph, a video, audio, an animation, etc. Such media content may be captured using end terminal 106 after selecting media capturing button 332, which may take user 112 to screen 500 of FIG. 5.

Figure 5:
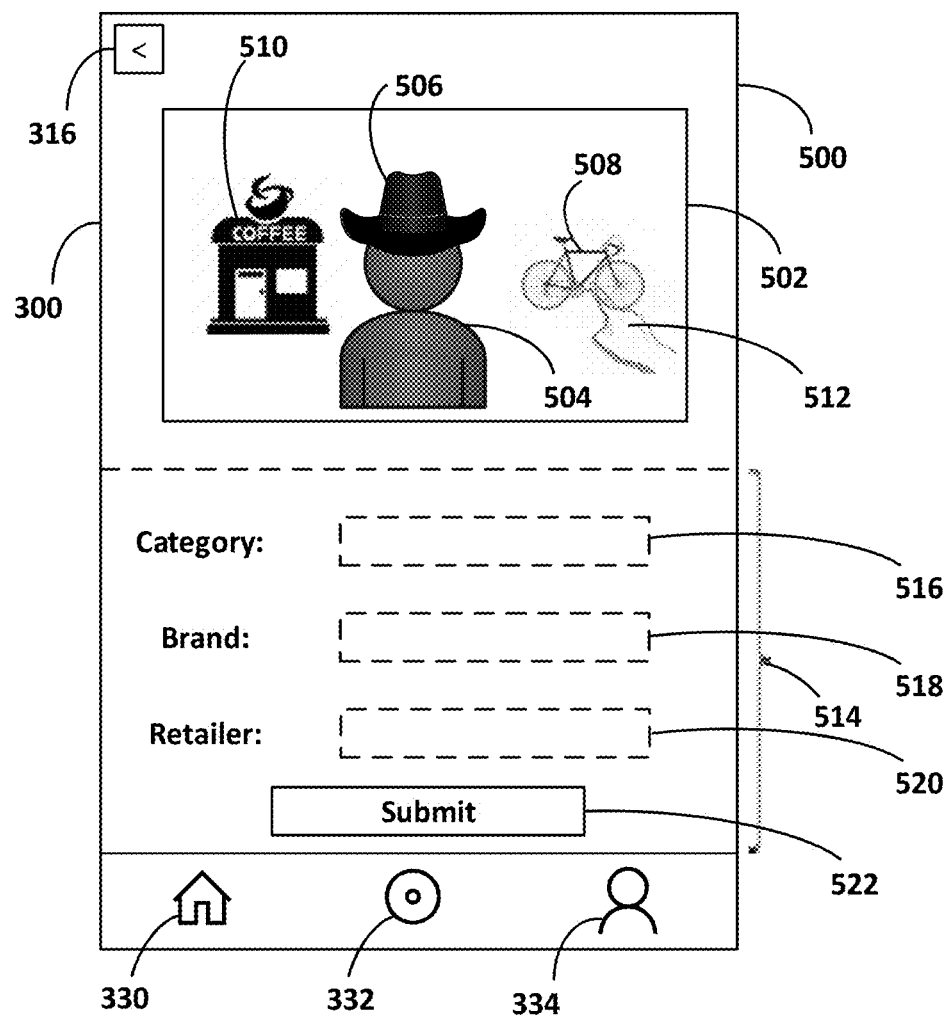
FIG. 5 is an example screen of a user's profile page on a digital social media platform, according to one aspect of the present disclosure.

FIG. 5 is an example screen of a user's profile page on a digital social media platform, according to one aspect of the present disclosure. Screen 500 includes persisting virtual buttons 316, 330, 332 and 334, as described above. Screen 500 may be appropriately adjusted depending on whether user 112 accesses the digital social media platform via a downloaded application on end terminal 106 or via a web browser. Regardless, the content available to user 112 may be the same or substantially the same as that shown in screen 500.

Screen 500 shows an example media content 502, which may either be taken live by user 112 using media capturing capabilities of end terminal 106 or may be uploaded from existing media content available on end terminal 106. Example media content 502 may be a photograph of a human being 504 (headshot) wearing hat 506. Media content 502 may also include one or more elements in the background of human being 504 such as bicycle 508 and coffee shop 510. Media content 502 is not limited to the example shown in FIG. 5 but can be any other type of content and may include more or less elements.

Once media content 502 is captured/selected and as will be described below in more detail, processing center 120 may utilized computer vision to automatically identify one or more items (elements) in media content 502 to be tagged and appropriate hashtags be created therefor. Once such item(s) are detected, trained machine learning models may be utilized to automatically identify various metadata associated with each element including category, brand, retailer, etc. Category 516, brand 518, and/or retailer 520 information may automatically be populated with output of trained machine learning model. For example, using computer vision, bicycle 508 may be detected in media content 502 by processing center 120. Bicycle 508 may then be fed through a trained machine learning model (may also be referred to as a trained neural network), the output of which may be metadata associated with bicycle 508 including, but not limited to, category of bicycle 508 (e.g., sporting goods), brand of bicycle 508 (e.g., Fiji), retailer that sells bicycle 508 (e.g., Performance Bike), etc. The outputs are then used to populate category 516, brand 518, and/or retailer 520 in screen 500. Trained machine learning model will be further described below with reference to FIG. 9. Furthermore, while category, brand and retailer have been used as examples of metadata for any given element detected in media content, the types of metadata are not limited to category, brand and retailer but instead can include additional and/or alternatively metadata.

As will be described below, metadata provided via fields 516, 518 and 520 may be used by processing center 120 to create and embed hashtags into media content 502 for posting to relevant communities within the digital social media platform of the present disclosure and monitoring of the hashtags and interactions of other users with such hashtags for creating personalized and user-specific loyalty identifier for user 112. The above process for tagging and providing associated metatags may be repeated for any number of elements within media content 502.

Figure 6:
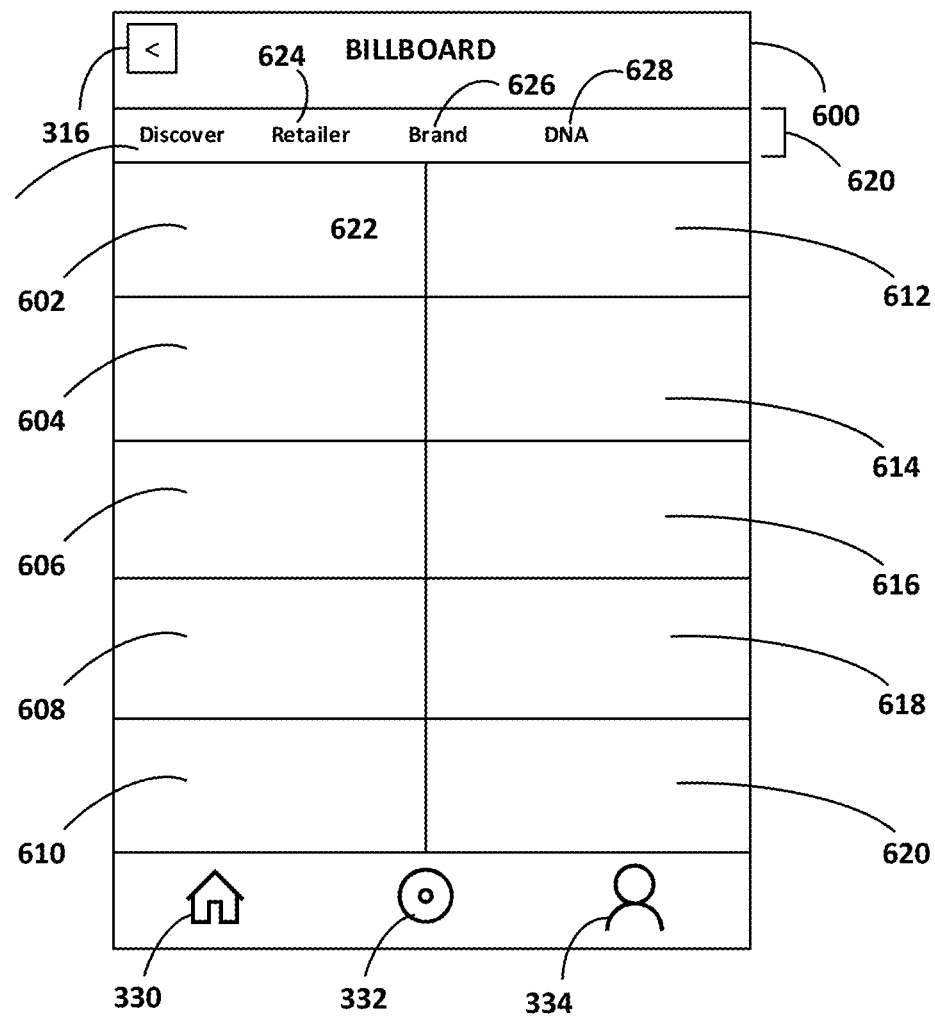
FIG. 6 is an example screen of a user's profile page on a digital social media platform, according to one aspect of the present disclosure.

FIG. 6 is an example screen of a user's profile page on a digital social media platform, according to one aspect of the present disclosure. Once media content 502 and associated metatags of selected element(s) thereof are identified for creation and embedding of hashtags, screen 500 may be switched to screen 600 of FIG. 6, which may be referred to as billboard or home page (also accessible via home button 330).

Screen 600 may be a tailored billboard or homepage for user 112 displayed on end terminal 106. Screen 600 may include persisting virtual buttons 316, 330, 332 and 334, as described above. Billboard of screen 600 may include a plurality of tiles 602, 604, 606, 608, 610, 612, 614, 616 and 618. Each of tiles 602, 604, 606, 608, 610, 612, 614 and 616 may be an uploaded content with embedded hashtags by other users of the digital social media platform. Every other user may generate content and provide associated metatags in a same manner as described above with reference to FIG. 5. Screen 600 may be appropriately adjusted depending on whether user 112 accesses the digital social media platform via a downloaded application on end terminal 106 or via a web browser. Regardless, the content available to user 112 may be the same or substantially the same as that shown in screen 600.

As will be described below, processing center 120 may filter uploaded contents of other users with embedded hashtags to determine which ones to include in billboard 600 for user 112 to view. This filtering may be based on favorite brands identified by user 112 using favorite brands option 406 described with reference to FIG. 4, any one of brands, categories or retailers specified as metadata of any one or more elements of media content 502, etc. Such filtering may also be coupled with geolocation of end terminal 106 and may be filtered to include uploaded media content of other users that are within specific geolocation of end terminal 106 and have one or more embedded hashtags within their uploaded content with the same brand, retailer, product category as that of one or more elements of uploaded media content on user profile of user 112 on the digital social media platform. For example, referring back to FIG. 5, bicycle 508 may have an embedded hashtag that includes product category, brand and retailer information for bicycle 508. Assuming media content 502 is the only media content uploaded by user 112 on his or her profile, then each one of tiles 602, 604, 608, 610, 612, 614 and/or 616 may include an uploaded content by other users of the digital social media platform with embedded hashtags that reflect the same or similar product category and/or the same or similar brand and/or the same or similar retailer information as the metadata of bicycle 508.

In other words, tiles 602, 604, 608, 610, 612, 614 and 616 may provide a brand community, a retailer community, a product category community that is tailored to user 112 and is relevant to media content and associated embedded hashtags available on user profile of user 112 on the digital social media platform.

Screen 600 further includes a section 620 with multiple options/filters to be selected for discovering relevant communities for user 112. For example, section 620 may have label 622 (Discover). Furthermore, section 620 may have selectable options such as option 624 for a retailer, option 626 for a category, option 626 for collective tags (DNA), etc. Selection of any one of these, results in tiles 602, 604, 608, 610, 612, 614 and 616 to be filtered to show communities corresponding only to the selected option. For example, if option 624 is selected and assuming that the only uploaded media content by user 112 is media content 502 as discussed, then processing center 120 filters all media content provided by other users to select only media contents with embedded hashtags reflecting Performance Bike (e.g., retailer associated with bicycle 508 described in the non-limiting example of FIG. 5), to be included in tiles 602, 604, 608, 610, 612, 614 and 616. Number of tiles is not limited to tiles 602, 604, 608, 610, 612, 614 and 616 but maybe more or less. If more, screen 600 allows a user thereof to scroll up and down to view various available tiles and relevant media content provided by other users and included in a displayed community on screen 600.

Figure 7:
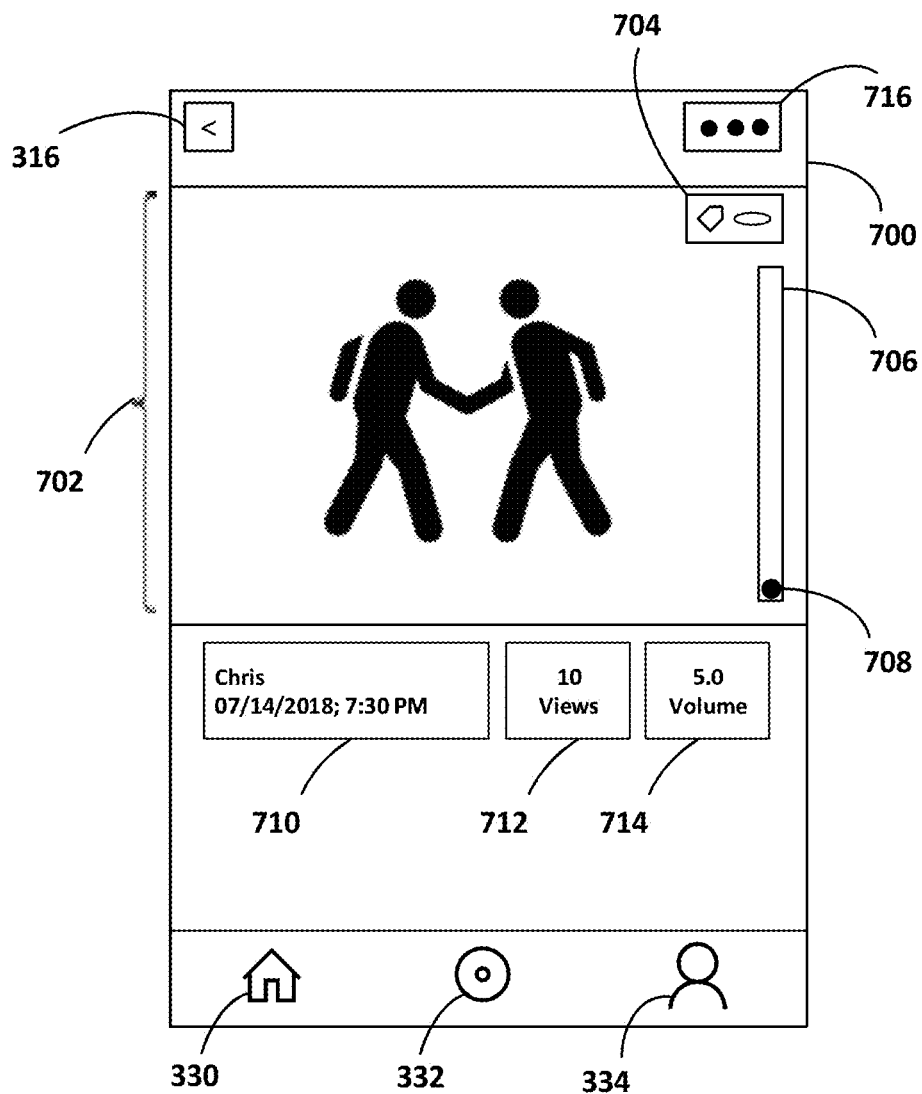
FIG. 7 is an example screen of a user's profile page on a digital social media platform, according to one aspect of the present disclosure.

FIG. 7 is an example screen of a user's profile page on a digital social media platform, according to one aspect of the present disclosure. More specifically, screen 700 of FIG. 7 illustrates a page on end terminal 106 when any one of tiles 602, 604, 606, 608, 610, 612, 614 or 616 is selected, each of which may be media content with embedded hashtags created by any other user within the brand community that is included in section 620 of screen 600. Screen 700 may be appropriately adjusted depending on whether user 112 accesses the digital social media platform via a downloaded application on end terminal 106 or via a web browser. Regardless, the content available to user 112 may be the same or substantially the same as that shown in screen 700.

As shown in FIG. 7, screen 700 may include persisting virtual buttons 316, 330, 332 and 334, as described above. Alternatively, virtual button 316 may be used for returning to screen 600. Screen 700 may include a content display area 702, which may display an uploaded media content (e.g., two individuals shaking hands, as shown in FIG. 7) selected from among tiles 602, 604, 606, 608, 610, 612, 614 or 616. This content may have one or more embedded hashtags. For purposes of describing FIG. 7, an assumption is made that media content shown in content display area 702 has been uploaded by user 114 via end terminal 108.

Hashtag virtual button 704, once selected, displays within media content shown in content display area 702, any element thereof that has an embedded hashtag created based on metadata provided by user 114. For example, selecting button 702 may display a virtual tag on upper body (e.g., a sweater) of one of the depicted individuals in the media content in display area 702 and another tag on a pair of pants of another one of the depicted individuals in the media content in display area 702 (assuming that the sweater and the pair of pants were selected for tagging by user 114 and corresponding metadata provided via end terminal 108.

Any one of the virtual tags corresponding to the example sweater or pair of pants may be selected, which results in a larger virtual tag to appear within display area 702. This larger tag may convey category of the tagged item (e.g., men's clothing, etc.), a brand of the sweater or the pair of pants and a link for "Go Shopping." The tag may be selected by user 112 on end terminal 106 that can then redirect (by switching to a web browser) user 112 to a website of the brand associated with the sweater/pair of pants or a retailer associated with the sweater/pair of pants.

In one example embodiment, user 112 may be directed to the website associated with the corresponding brand/retailer of a tagged item such as the example sweater/ pair of pants or may be taken to specific sections within the website that only includes same/similar sweaters or pairs of pants. As will be described below, any of the above actions taken on end terminal 106 (i.e., selecting to view media content uploaded by user 114 via end terminal 108, viewing tags, visiting corresponding brand/retailer websites and/or purchasing items with the visited websites) may result in loyalty points to be accrued by user 114 and used to calculate a user-specific loyalty identifier (social capital score) for user 114. Same may be done for user 112 if other users view and engage/interact with media content 502 uploaded by user 112 onto his or her profile on the digital social media platform.

Screen 700 may further include a bar 706 with a virtual knob/button 708. As media content within display area 702 is viewed, virtual knob/button 708 may be moved up or down along bar 706 to indicate a varying level of interest in the media content and the embedded hashtags thereof being viewed by user 112 on end terminal 106. For example, a high level of interest may be indicated by moving virtual knob/button 708 to the upper most part of bar 706 while a lowest level of interest may be indicated by leaving virtual knob/button 708 as currently shown in FIG. 7. Indications provided via virtual knob/button 708 may be used as data for retraining and/or fine-tuning trained machine learning models that are deployed for automatic tagging of detected items or elements in an uploaded medial content. For example, when an item which is automatically tagged using trained machine learning models of the present disclosure, gets a high level of interest via virtual knob/button, this high level of interest may be used as an indication that the output of the trained machine learning model (e.g., category, brand, retailer, etc.) for the corresponding detected item was accurate and thus the model may be reinforced (by adjusting relevant weights in the model) to increase corresponding biases and ensure that same output are generated for the same and similar items in the future.

Screen 700 may further include various pieces of information associated with media content being displayed within display area 702. For example, identification information 710 may include a name of a user of the digital social media platform who uploaded the displayed media content (e.g., user 114 in this example). Furthermore, information 712 may indicate a number of user views of the displayed media content and information 714 may indicate a volume of the displayed media content (which can vary based on level of interest indicated via bar 706 and knob 708).

Screen 700 may optionally include access button 716 which may allow an operator or viewer of end terminal 106 such as user 112 to report to backend platform 104 of system 100 and operators of the digital social media platform suspicious or inappropriate media content that may violate civil laws or regulations, may be criminal and/or may be in violation of agreed upon policies or rules of conduct on the digital social media platform.

With various screens and example of the digital social media platform of the present application, as accessible for viewing and engagement with, on a given end terminal by a corresponding operator thereof (e.g., such as end terminal 106 and user 112 referenced throughout description of FIGS. 2-7), the disclosure now describes example methods implemented by backend platform 104 and in particular processing center 120 to creating and embedding hashtags for each uploaded media content based on corresponding metadata provided as well as tracking other users' interactions and engagements with tagged media content for purposes of determining user-specific loyalty points and user-specific loyalty identifiers (social capital scores).

Figure 8:
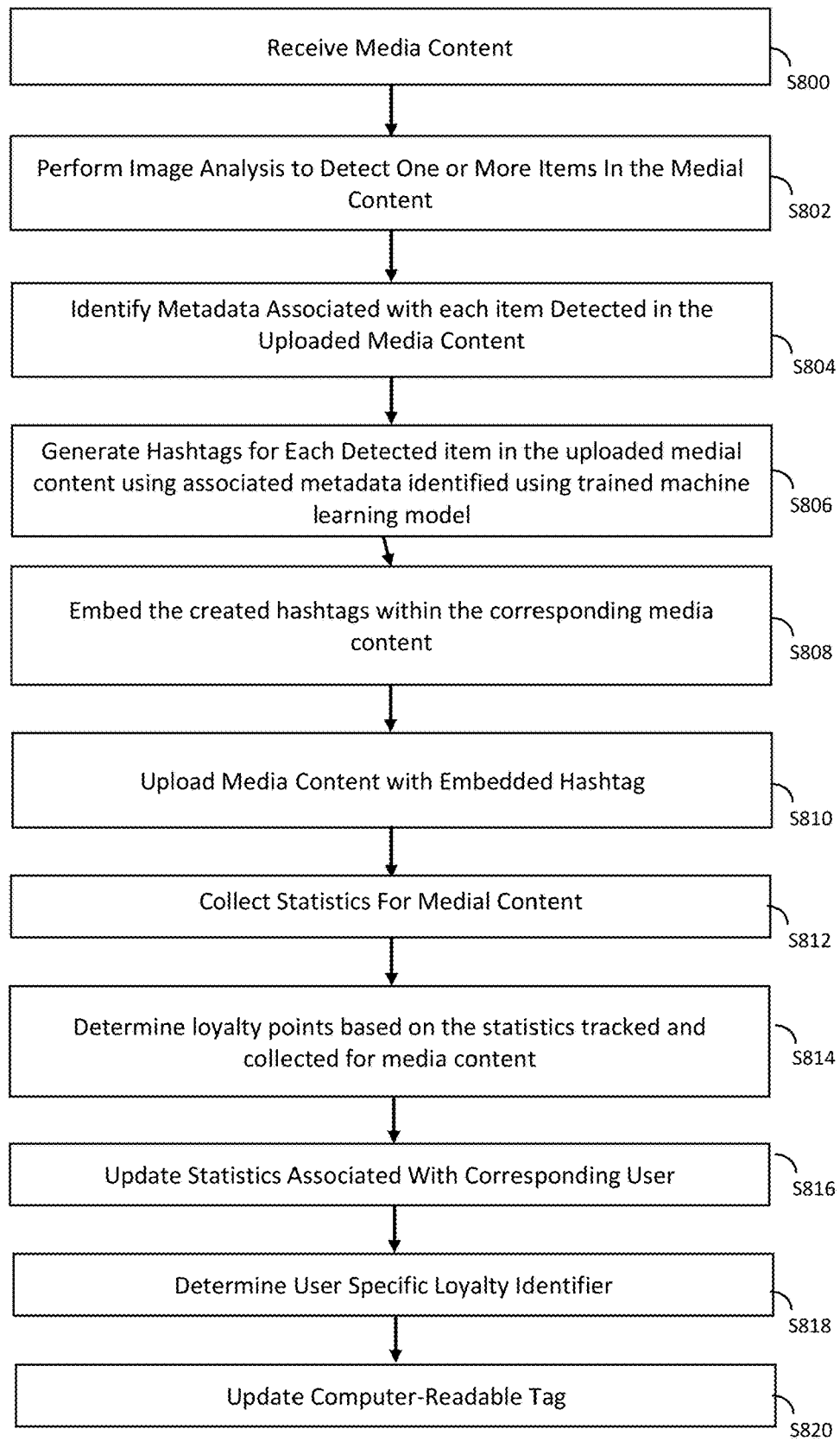
FIG. 8 describes an example method of creating, embedding and tracking hashtags for creating user-specific loyalty identifiers, according to one aspect of the present disclosure.

FIG. 8 describes an example method of creating, embedding and tracking hashtags for creating user-specific loyalty identifiers, according to one aspect of the present disclosure. FIG. 8 will be described from the perspective of processing center 120. As mentioned above, processing center 120 may have one or more processors configured to execute computer-readable instructions stored in one or more associated memories for implementing steps of FIG. 8. FIGS. 1-7 may be referred to when describing steps of FIG. 8.

At S800, processing center 120 receives media content. For example, processing center 120 receives media content 502 via end terminal 106. User 112 may utilize end terminal 112 to capture or otherwise retrieve a particular media content (e.g., video, photo, etc.) and upload the same to their profile on the digital social media platform.

At S802, processing center 120, may perform image analysis using known or to be developed computer vision techniques to automatically detect one or more items in the media content. For example, by accessing processing platform 124 and/or database 126 of FIG. 1 (which may be, for example, a third-party developed computer vision and image detection service including, but not limited to, Google Vision). Such computer vision service may itself rely on trained machine learning algorithms to receive an image as an input and provide as output one or more items detected in the image. For example, such items in an uploaded photo can be, an individual's shirt, tie, bag, shoes, bicycle, location at which the individual is present, etc. In one example, one or more Application Programming Interfaces (APIs) may be utilized to access the computer vision and image detection service for detecting one or more items in the media content received at S800.

At S804, processing center 120 may use a trained machine learning model for automatically identifying metadata associated with each item detected in the uploaded media content at S802. As described above with reference to FIG. 5 for example, such metadata can include, but is not limited to, a category, a brand, and/or a retailer associated with each item detected in the uploaded image. In one example, the trained machine learning model used at S804 may be different that any trained machine learning model utilized by computer vision and image detection service used at S802. In another example, a single machine learning model may be trained and utilized at S802 and S804 for detecting items and corresponding metadata in uploaded media content. In such case, processes S802 and S804 may be performed simultaneously (or alternatively be combined into a single step). In one or more examples, the trained machine learning model may receive the detected items as input and use information to identify the associated metadata. The information used for automatically identifying metadata may be obtained from the third-party database(s) (public, private, and/or hybrid accessible databases) and/or historical information previously provided by the user who uploaded the media content (e.g., patterns in user preference on clothing, brands, retailers, types of clothing articles or other belongings that the user has purchased in the past and/or has used in previously uploaded media content, etc.).

Machine learning model (also referred to as a neural network) may be trained using a set of data (e.g., a data set of items and associated metadata). The set of data may be divided into training and test subsets for training and then validating (and/or fine tuning) the model. Details of architecture and training of example machine learning model that may be utilized at S804 will be further described below with reference to FIG. 9.

In one example, process of step S802 may be referred to as auto-detecting of elements in uploaded media content and process of step S804 may be referred to as auto-tagging of detected elements in uploaded media content. In another example, the processes of auto-detecting and auto-tagging may be performed simultaneously and as a single step.

In one example (optionally), after one or more items in an uploaded content are auto-detected and auto-tagged, processing center 120 may provide user 112 with one or more recommendations of similar detected items (e.g., either in the photo, in the caption of the photo, as a push notification or a pop-up alert, etc.).

At S806, processing center 120 using any known or to be developed method, may create/generate hashtags for each detected item in the uploaded medial content using associated metadata identified using trained machine learning model at S804. Each hashtag may be created/generated for each element of the received media content for which a set of metadata is also provided. For example, processing center creates hashtag for bicycle 508 using metadata (e.g., product category, brand and/or retailer as described above) automatically identified by trained machine learning model at S804. The created hashtag may be similar to any one of hashtags that may later on be viewed and accessed by another user in a similar fashion as described above with reference to FIG. 7, where hashtags for the example sweater and pair of pants within media content uploaded by user 114 is described.

At S808, processing center embeds the created hashtags within the corresponding media content received at S800. In one example, a separate hashtag may be embedded for every element within media content 502 and in association with a corresponding element within the media content for which the corresponding set of metadata is received. For example, if hat 506 is an element within media content 502, then a hashtag is created for hat 506 and is embedded in relation to hat 506 such that whenever a viewer selects virtual button 704, a virtual hashtag appears on or near hat 506 within media content 502.

At S810, processing center 120 uploads (sends or publishes) media content 502 with embedded hashtags to communities (virtual communities) on profiles of other users of the digital social media platform based on a match between product categories, tags, brands, retailers associated with media content 502 and those associated with media content uploaded by other users of the digital media social platform. In one example, the matching may also take into consideration geographical proximities and geo locations when determining which communities to include media content 502 in.

At S812, processing center 120 tracks and collects various statistics for media content 502. The statistics may reflect engagement and interaction of other users with media 502 and associated embedded hashtags. In one examples, the statistics include, but are not limited to, number of views of media content 502 by other users, number of views of embedded hashtags of media content 502, number of visits to associated brands/retailers of each embedded hashtag of media content 502, whether another user has made an attempt or completed a purchase of a similar or different product from the same retailer/brand or alternatively a similar product from other retailers/brands, etc.

At S814, processing center 120 determines loyalty points for user 112 based on the statistics tracked and collected at S808 for media content 502. In one example, loyalty points may be determined partially based on the collected statistics. For example, processing center 120 may assign a number of points for uploading content, providing metadata for element(s) within an uploaded content, etc. In one specific example, 5 loyalty points for uploading media content 502, 1 loyalty point for tagging each element such as bicycle 508, 1 loyalty point for providing brand metadata, 1 loyalty point for providing category metadata, 1 loyalty point for providing retailer metadata, may be assigned.

Furthermore, each collected statistic may result in a certain number of loyalty points being accrued by a corresponding user (e.g., user 112). For example, each view of media content 502 by another user may result in 1 loyalty point, each rating (e.g., using knob 708 and bar 706 of FIG. 7) may result in a loyalty point ranging from 1-5 depending on the varying rating indicated using bar 706 and knob 708, each click on an embedded hashtag and redirecting to a corresponding brand/retailer website may result in 10 loyalty points, each purchase made during such visit may result in 20 loyalty points. In one example embodiment, the specific type of item purchased may result in different number of loyalty points. For example, exact item may result in 20 loyalty points for user 112, similar item may result in 18 loyalty points, etc.

The above example numbers of loyalty points for each piece of information are non-limiting and may be adjusted by operators of processing center 120 (programmed or modified) based on experiments and/or empirical studies.

At S816, processing center 120 updates statistic associated with corresponding user and may reflect the same on profile of the corresponding user on the user's end terminal. For example, as a result of tracking engagements and interactions with content 502 and the resulting statistics, various statistics such as loyalty statistic 306, tags statistic 308, view statistic 310 and/or network statistic 312, described above with reference to FIG. 3, may be modified or updated (e.g., loyalty statistic 306 and view statistic 310 may be increased).

At S818, processing center 120 may determine an updated user-specific loyalty identifier (social capital score) for the corresponding user (e.g., user 112) based on a weighted combination of updated loyalty statistics 306, tags statistic 308, view statistic 310 and/or network statistic 312. The weights and exact combination of these statistics for determining user-specific loyalty identifier for a given user may be configurable and determined based on experiments and/or empirical studies.

At S820, processing center 120 may update a computer-readable tag (e.g., a barcode or a QR code) that is reflective of a corresponding user's social capital score and visited/associated brands, retailers, products, etc. This computer-readable tag may be accessible via option 410 as described above with respect to FIG. 8. Computer-readable tag may be reflective of user 112's specific loyalty identifier may contain information about various purchases, brands, retailers, product types and categories of interest to user 112 and is also reflective/indicator of user 112's circle or level of influence on other users within the virtual communities of the digital social media platform of the present application having similar interests as user 112. In other words, user-specific identifier (social capital score) of user 112 is an indicator of his or her level of influence, within various relevant communities on the digital social media platform, related to causing or triggering other/similar purchases by other users after viewing media content posted by user 112.

As noted above with respect to FIG. 1, processing center 120 and more generally the digital social media platform of the present application may partner with a number of retailers, brands, merchants, etc. such as those associated with processing center 124 and/or database 126. Given that the computer-readable tag of S816 includes and embeds information about multiple purchases and interests and loyalty of user 112, computer-readable code may be scanned by any reading/image capturing device (e.g., a point of sale device) of any one of the partner retailers, brands, merchants, etc., to provide user 112 with relevant discounts, promotions, coupons, etc., when user 112 and end terminal 106 are detected within a premise operated by any one of partner retailers, brands, merchants, etc. In another example, scanning of the computer-readable tag may redirect user 112 from his or her profile page to a website associated with a merchant/retailer/brand, when the scanning is performed by a device associated with that same merchant/retailer/brand.

In one example, an exact methodology used for converting user 112's social capital score into coupons, promotions, discounts, etc., may be implemented by retailer/brand specific algorithms that may determine, for example, how many loyalty points or what score ranges should be translated into certain discounts, a certain coupon, a certain extra free item or items, etc.

In another aspect, digital social media platform of the present application, when downloaded on an end terminal and/or access via a web browser, may prompt user 112 whether a specific browser should be associated with digital social media platform of the present application such that whenever a link (e.g., "Go shopping" link described above) is selected or whenever computer-readable tag is selected, the specific browser will be used as a default browser for accessing the relevant merchant/retailer/brand website. Such specific browser may be a secure browser that prevents tracking cookies related to user 112's browsing on the specific browser and/or prevents any advertisements from being displayed on end terminal 106. In another example, such browser may be crypto based, where user 112 can earn cryptocurrencies for the time he or she spends browsing on the specific browser. In one example, such cryptocurrencies accrued by user 112 may be coupled to user 112's social capital score for redemption as coupons, discounts, promotions, etc. at relevant merchants, retailers, brands, etc.

Figure 9:
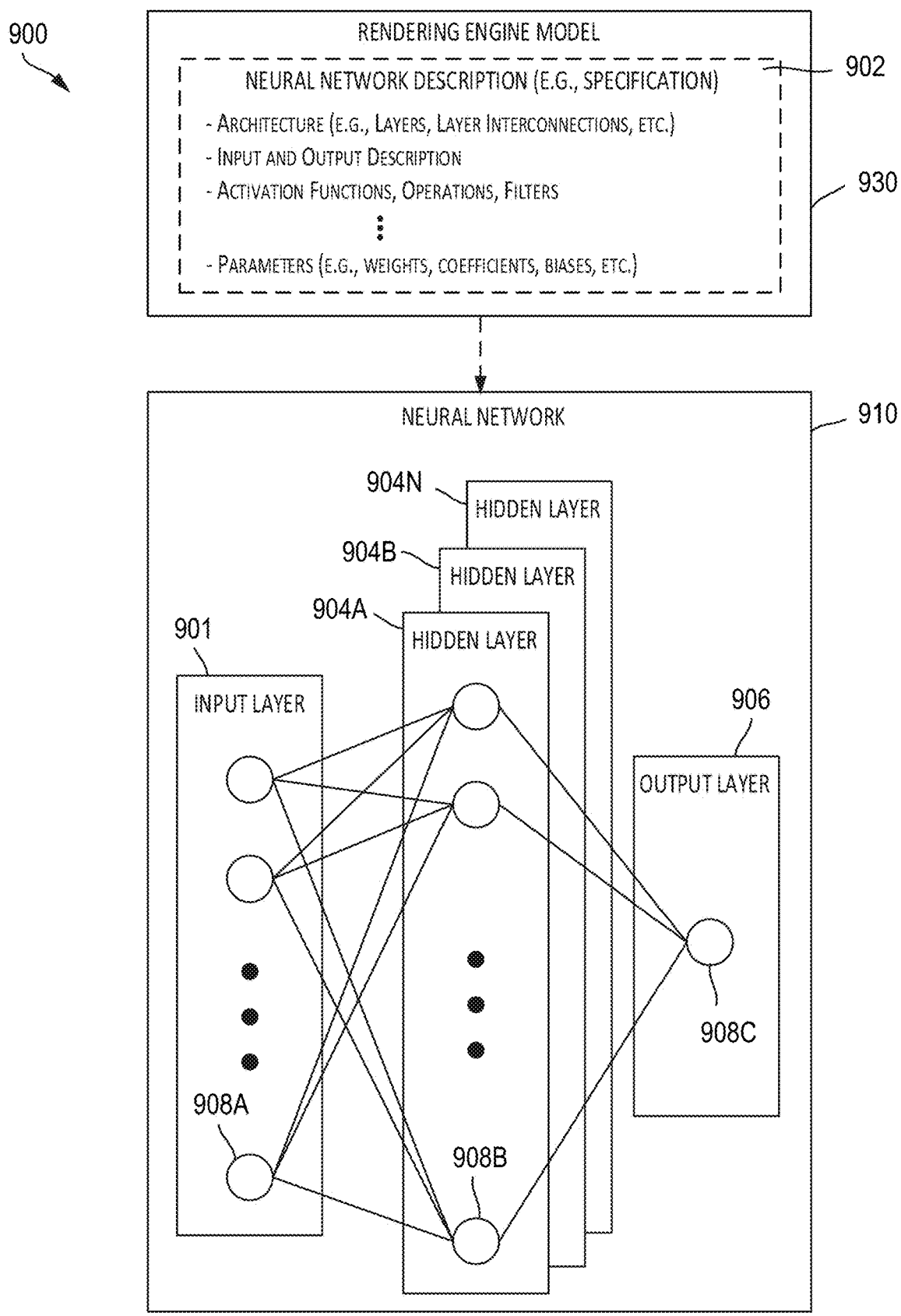
FIG. 9 illustrates an example neural network architecture, according to one aspect of the present disclosure.

FIG. 9 illustrates an example neural network architecture that can be trained for detecting one or more elements (items) in uploaded media content and/or associated metadata for creating and embedding hashtags in the media content, as described above. Architecture 900 includes a neural network 910 defined by an example neural network description 901 stored in rendering engine model 930. Neural network 910 can represent a neural network implementation by processing center 120 for performing steps S802 and/or S804 described above with reference to FIG. 8. Neural network description 901 can include a full specification of neural network 910. For example, neural network description 901 can include: a description or specification of neural network 910 (e.g., the layers, layer interconnections, number of nodes in each layer, etc.); an input and output description which indicates how the input and output are formed or processed; an indication of the activation functions in the neural network, the operations or filters in the neural network, etc.; neural network parameters such as weights, biases, etc.; and so forth.

In this example, neural network 910 includes an input layer 902, which includes input data such as uploaded media content and/or individual item(s) detected within an upload content such as a shirt, a pair of pants, a pair of shoes, a watch, a bicycle, a hat, a location in which the uploaded content is taken, as described above. While such input data is reflective of inputs to trained neural networks such as neural network 910, when deployed and utilized for machine learning based auto-detecting and/or auto-tagging of items in uploaded content in real-time, neural network 910 and/or other networks utilized may be trained first using similar input data already collected (e.g., stored in datastore 122 of FIG. 1) by processing center 120. A portion of the training data set may be used for testing and validating the trained neural networks. Furthermore, when deployed in real-time, each time an item is detected and tagged (and/or optionally feedback on the detected item is received via virtual knob/button 708, as discussed above with reference to FIG. 7), the resulting data may be used to refine and update the corresponding neural networks, thus providing a continuous updating of the utilized neural networks. Training data may, in part, use information available from public or third-party databases to detect items and/or identify associated metadata. Training data may, also in part, use historical information collected on past uploaded content and user trends in types of clothing articles and belongings that the user is interested in, associated brands, retailers, types of articles and belongings, etc.

Neural network 910 includes hidden layers 904A through 904N (collectively "904" hereinafter). Hidden layers 904 can include n number of hidden layers, where n is a positive integer greater than or equal to one. The number of hidden layers can include as many layers as needed for a desired processing outcome and/or rendering intent. Neural network 910 further includes an output layer 906 that provides an output from the processing performed by hidden layers 904. In one illustrative example, output layer 906 can metadata associated with each detected item including, but not limited to, a category, a brand, a retailer, etc., as discussed above.

In one example, neural network 910 is a multi-layer neural network of interconnected nodes. Each node can represent a piece of information. Information associated with the nodes is shared among the different layers and each layer retains information as information is processed. In some cases, neural network 910 can include a feed-forward neural network, in which case there are no connections between nodes that form an enclosed cycle, or where outputs of the neural network are fed back into itself. In other cases, neural network 910 can include a recurrent neural network, such as a Hopfield network, which can have loops that allow information to be carried across nodes while reading in input. Some recurrent neural networks can be simplified as feed-forward neural networks, while others can only be implemented as recurrent neural networks. Another example neural network can be a convolutional neural network (CNN), which includes an input layer and an output layer, with multiple hidden layers between the input and out layers. The hidden layers of a CNN include a series of convolutional, nonlinear, pooling (for downsampling), and fully connected layers. In other examples, the neural network 910 can represent any other neural or deep learning network, such as an autoencoder, a deep belief nets (DBNs), Recurrent Neural Networks (RNNs), etc.

Information can be exchanged between nodes through node-to-node interconnections between the various layers. Nodes of input layer 902 can activate a set of nodes in first hidden layer 904A. For example, as shown, each of the input nodes of input layer 902 is connected to each of the nodes of first hidden layer 904A. The nodes of hidden layer 904A can transform the information of each input node by applying activation functions to the information. The information derived from the transformation can then be passed to and can activate the nodes of the next hidden layer (e.g., 904B), which can perform their own designated functions. Example activation functions include convolutional, up-sampling, data transformation, pooling, and/or any other suitable functions. The output of the hidden layer (e.g., 904B) can then activate nodes of the next hidden layer (e.g., 904N), and so on. The output of the last hidden layer can activate one or more nodes of output layer 906, at which point an output can be provided. In some cases, while nodes (e.g., nodes 908A, 908B, 908C) in neural network 910 are shown as having multiple output lines, a node has a single output and all lines shown as being output from a node represent the same output value.

In some cases, each node or interconnection between nodes can have a weight that is a set of parameters derived from training neural network 910. For example, an interconnection between nodes can represent a piece of information learned about the interconnected nodes. The interconnection can have a numeric weight that can be tuned (e.g., based on a training dataset), allowing neural network 910 to be adaptive to inputs and able to learn as more data is processed.

Neural network 910 can be pre-trained to process the features from the data in input layer 902 using the different hidden layers 904 in order to provide the output through output layer 906. In some cases, neural network 910 can adjust weights of nodes using a training process called backpropagation. Backpropagation uses the difference between the output of neural network 910 and the desired output to compute an error in the calculation made by neural network 910. This error can then be passed among the nodes of neural network 910 to adjust weights and result in a more accurate calculation of the desired output. Backpropagation can include a forward pass, a loss function, a backward pass, and a weight update. The forward pass, loss function, backward pass, and parameter update is performed for one training iteration. The process can be repeated for a certain number of iterations for each set of training media data until the weights of the layers are accurately tuned.

For a first training iteration for neural network 910, the output can include values that do not give preference to any particular class due to the weights being randomly selected at initialization. For example, if the output is a vector with probabilities that the object includes different product(s) and/or different users, the probability value for each of the different product and/or user may be equal or at least very similar (e.g., for ten possible products or users, each class may have a probability value of 0.1). With the initial weights, neural network 910 is unable to determine low level features and thus cannot make an accurate determination of what the classification of the object might be. A loss function can be used to analyze errors in the output. Any suitable loss function definition can be used.

The loss (or error) can be high for the first training dataset (e.g., images) since the actual values will be different than the predicted output. The goal of training is to minimize the amount of loss so that the predicted output comports with a target or ideal output. Neural network 910 can perform a backward pass by determining which inputs (weights) most contributed to the loss of neural network 910 and can adjust the weights so that the loss decreases and is eventually minimized.

A derivative of the loss with respect to the weights can be computed to determine the weights that contributed most to the loss of neural network 910. After the derivative is computed, a weight update can be performed by updating the weights of the filters. For example, the weights can be updated so that they change in the opposite direction of the gradient. A learning rate can be set to any suitable value, with a high learning rate including larger weight updates and a lower value indicating smaller weight updates. Accordingly, a defined neural network can be trained as desired to be used as any one of trained neural networks of AI-based merchant service recommendation module 112 of FIG. 1 to generate customized list of merchant service recommendation for different merchants.

With above examples of the digital social media of the present application, the disclosure now turns to description of components of possible devices that may be implemented as any one or more of end terminals 106, 108, 110, processing center 120 and/or any other component of system 100 described above with reference to FIG. 1.

Figure 10:
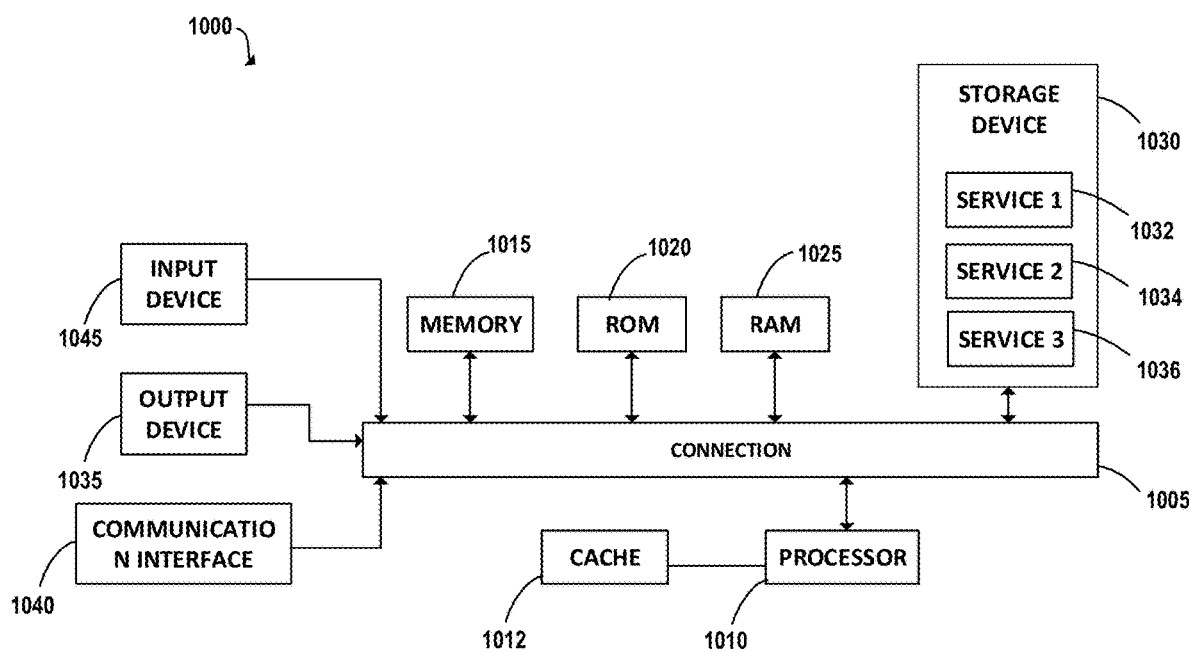
FIG. 10 shows an example of a system for implementing the present technology, according to one aspect of the present disclosure.

FIG. 10 shows an example of a system for implementing the present technology, according to one aspect of the present disclosure. FIG. 10 shows an example of computing system 1000 in which the components of the system are in communication with each other using connection 1005. Connection 1005 can be a physical connection via a bus, or a direct connection into processor 1010, such as in a chipset architecture. Connection 1005 can also be a virtual connection, networked connection, or logical connection.

In some embodiments computing system 1000 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 1000 includes at least one processing unit (CPU or processor) 1010 and connection 1005 that couples various system components including system memory 1015, such as read only memory (ROM) and random access memory (RAM) to processor 1010. Computing system 1000 can include a cache 1012 of high-speed memory connected directly with, in close proximity to, or integrated as part of processor 1010.

Processor 1010 can include any general purpose processor and a hardware service or software service, such as services 1032, 1034, and 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which can represent any number of input mechanisms, such as a microphone for speech, a touch-sensitive screen for gesture or graphical input, keyboard, mouse, motion input, speech, etc. Computing system 1000 can also include output device 1035, which can be one or more of a number of output mechanisms known to those of skill in the art. In some instances, multimodal systems can enable a user to provide multiple types of input/output to communicate with computing system 1000. Computing system 1000 can include communications interface 1040, which can generally govern and manage the user input and system output. There is no restriction on operating on any particular hardware arrangement and therefore the basic features here may easily be substituted for improved hardware or firmware arrangements as they are developed.

Storage device 1030 can be a non-volatile memory device and can be a hard disk or other types of computer-readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 1030 can include software services, servers, services, etc., that when the code that defines such software is executed by the processor 1010, it causes the system to perform a function. In some embodiments, a hardware service that performs a particular function can include the software component stored in a computer-readable medium in connection with the necessary hardware components, such as processor 1010, connection 1005, output device 1035, etc., to carry out the function.

The phrases "in some examples," "according to various examples," "in the examples shown," "in one example," "in other examples," "various examples," "some examples," and the like generally mean the particular feature, structure, or characteristic following the phrase is included in at least one example of the present disclosure, and may be included in more than one example of the present disclosure. In addition, such phrases do not necessarily refer to the same examples or to different examples.

If the specification states a component or feature "can," "may," "could," or "might" be included or have a characteristic, that particular component or feature is not required to be included or have the characteristic.

With various examples of using machine learning techniques to automatically detect and tag items in uploaded media content, next, examples of implementing disclosed digital social media platform as a SaaS will be described next with reference to FIG. 11.

Figure 11:
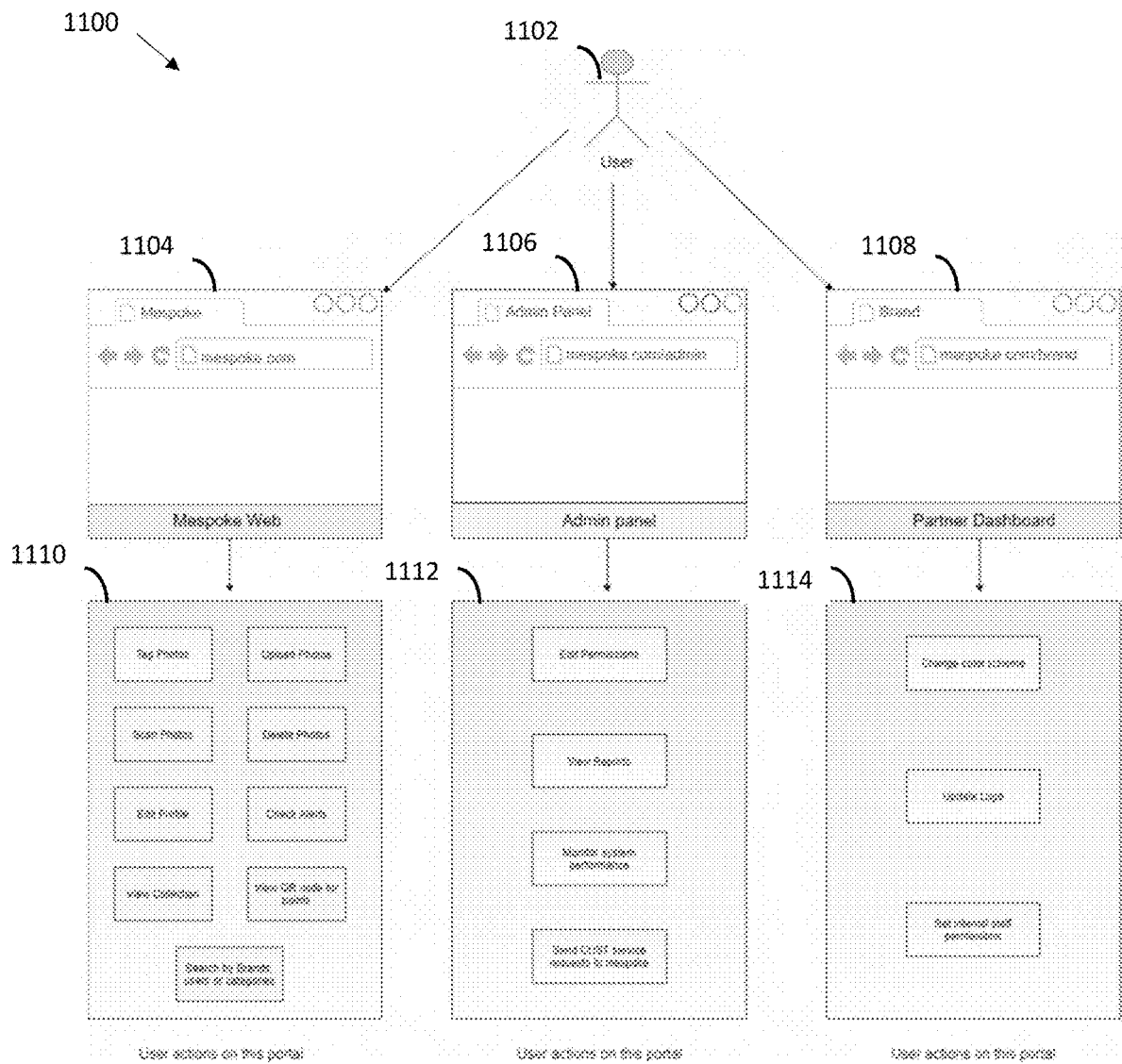
FIG. 11 describes an example SaaS implementation of digital social media platform of the present disclosure, according to one aspect of the present disclosure.

FIG. 11 describes an example SaaS implementation of digital social media platform of the present disclosure, according to one aspect of the present disclosure. In example SaaS environment 1100, a user 1102 may be associated with any one of user portal 1104, an admin portal 1106, and a partner portal 1108 are shown. User portal 1104 may be a web accessible version or a downloadable application of digital social media platform of the present disclosure. Admin portal 1106 may be communicatively coupled to a backend system including processing center 120 and other components or database of system 100 of FIG. 1. Admin portal 1106 may be accessed and operated by an administrator or operator of digital social media platform of the present disclosure. Partner portal 1108 may be accessible to and operated by any merchant (e.g., a brand or a retailer) that signs up and utilized digital social media platform and associated services offered by digital social medial platform provider of the present disclosure. While FIG. 11 shows a single user associated with user portal 1104, admin portal 1106, and partner portal 1108, user 1102 may be different in each instance. For example, when accessing user portal 1104, user 1102 may be any one of users 112, 114, and/or 116 of FIG. 1 accessing user portal 1104 on their respective end terminals 106, 108, and/or 110. When accessing admin portal 1106, user 1102 may be an operator or administrator of digital social medial platform and its backend system. When accessing partner portal 1108, user 1102 may be an operator or administrator of systems of the partner (e.g., the brand or retailer) accessing and utilizing services of digital social media platform of the present disclosure.

Digital social medial platform and its services may be structured in a way that any given partner (e.g., a brand or a retailer) can sign us and utilize its services and functionalities. Various functionalities available to user 1102 when accessing user portal 1104 are shown in element 1110 of FIG. 11. Such functionalities include, but are not limited to, uploading media content such as photos and videos, tag photos, delete photos, scan photos, edit profile, check alerts, view QR code, search by brands, users, and/or categories, etc.

Various functionalities available to user 1102 when accessing admin portal 1106 are shown in element 1112. Such functionalities include, but are not limited to, edit permissions, view reports, monitor system performance, send and/or otherwise manage customer (either users or partner merchants, brands or retailers) service requests.

Various functionalities available to user 1102 when access partner portal 1108 are shown in element 1114. Such functionalities include, but are not limited to, manage appearance such as color scheme, set internal staff permission, update logo, etc.

For clarity of explanation, in some instances the present technology may be presented as including individual functional blocks including functional blocks comprising devices, device components, steps or routines in a method embodied in software, or combinations of hardware and software.

Claim language reciting "at least one of" refers to at least one of a set and indicates that one member of the set or multiple members of the set satisfy the claim. For example, claim language reciting "at least one of A and B" means A, B, or A and B.

In some example embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
   receiving media content via a user device of a user to be published online;
   automatically identifying one or more elements and associated metadata in the media content using a computer vision technique;
   using a trained machine learning model, generating one or more hashtags for the media content, wherein the trained machine learning model receives, as input, user characteristic information of the user and the one or more elements automatically identified and provides, as output, the one or more hashtags, each of the one or more hashtags identifying at least a corresponding merchant for a corresponding one of the one or more elements detected in the media content;
   embedding the one or more hashtags within the media content;
   publishing the media content with the one or more hashtags for one or more remote users to interact with, the one or more remote users being different than the user that created the media content, wherein once published, a click on the media content visually places the one or more hashtags at an associated location of the corresponding one of the one or more elements inside the media content, each of which when selected, redirects a corresponding one of the one or more remote users to a merchant site of the corresponding merchant;
   tracking interactions of the one or more remote users with the media content having the one or more hashtags embedded therein to yield a set of statistics, the interactions including at least viewing the media content, clicking on any of the one or more hashtags embedded within the media content, and purchasing a product on the merchant site of the corresponding merchant; and
   one of generating or updating a user-specific loyalty identifier for the user based on the set of statistics, the user-specific loyalty identifier being a cumulative measure of redeemable value of the user based on at least the interactions of the one or more remote users with the media content, the user-specific loyalty identifier being available as a computer-readable tag on the user device of the user for redemption.

2. The method of claim 1, wherein the computer vision technique utilizes a corresponding trained machine learning model to detect the one or more elements.

3. The method of claim 2, wherein the corresponding trained machine learning model uses at least information on historical trends of the user to automatically identify the associated metadata for each identified one of the one or more elements.

4. The method of claim 1, wherein tracking the interactions is triggered when at least one of the one or more remote users views the media content or selects an embedded hashtag of the one or more hashtags within the media content.

5. The method of claim 1, wherein each of the interactions has a corresponding number of loyalty point that is added to the user-specific loyalty identifier assigned to the user when detected during tracking the interactions.

6. The method of claim 1, wherein the user-specific loyalty identifier is redeemable in a form of a cryptocurrency.

7. The method of claim 1, wherein the media content is one of a photo, a video, an audio file, or an animation.

8. A online media platform comprising:
   a processing center communicatively coupled to a plurality of user devices and configured to:
      receive media content via at least one user device of the plurality of user devices to be published on the online media platform, the user device having a corresponding user;
      automatically identify one or more elements and associated metadata in the media content using a computer vision technique;
      using a trained machine learning model, generate one or more hashtags for the media content, wherein the trained machine learning model receives, as input, user characteristic information of the corresponding user and the one or more elements automatically identified and provides, as output, the one or more hashtags, each of the one or more hashtags identifying at least a corresponding merchant for a corresponding one of the one or more elements detected in the media content;
      embed the one or more hashtags within the media content;
      publish the media content with the one or more hashtags for one or more remote users to interact with, the one or more remote users being different than the corresponding user that created the media content, wherein once published, a click on the media content visually places the one or more hashtags at an associated location of the corresponding one of the one or more elements inside the media content, each of which when selected, redirects a corresponding one of the one or more remote users to a merchant site of the corresponding merchant;
      track interactions of the one or more remote users with the media content having the one or more hashtags embedded therein to yield a set of statistics, the interactions including at least viewing the media content, clicking on any of the one or more hashtags embedded within the media content, and purchasing a product on the merchant site of the corresponding merchant; and
      one of generate or update a user-specific loyalty identifier for the corresponding user based on the set of statistics, the user-specific loyalty identifier being a cumulative measure of redeemable value of the corresponding user based on at least the interactions of the one or more remote users with the media content, the user-specific loyalty identifier being available as a computer-readable tag on the user device of the corresponding user for redemption.

9. The online media platform of claim 8, wherein the computer vision technique utilizes a corresponding trained machine learning model to detect the one or more elements.

10. The online media platform of claim 9, wherein the corresponding trained machine learning model uses at least information on historical trends of the corresponding user to automatically identify the associated metadata for each identified one of the one or more elements.

11. The online media platform of claim 8, wherein the processing center is configured to track the interactions when at least one of the one or more remote users views the media content or selects an embedded hashtag of the one or more hashtags within the media content.

12. The online media platform of claim 8, wherein each of the interactions has a corresponding number of loyalty point that is added to the user-specific loyalty identifier assigned to the corresponding user when detected during tracking the interactions.

13. The online media platform of claim 8, wherein the online media platform is a Software-as-a-Service platform to which one or more merchants can subscribe.

14. The online media platform of claim 8, wherein the user-specific loyalty identifier is redeemable in a form of a cryptocurrency.

15. The online media platform of claim 8, wherein the media content is one of a photo, a video, an audio file, or an animation.

16. One or more non-transitory computer-readable media comprising computer-readable instructions, which when executed by one or more processors, cause the one or more processors to:
receive media content via at least one user device having a corresponding user;
automatically identify one or more elements and associated metadata in the media content using a computer vision technique;
using a trained machine learning model, generate one or more hashtags for the media content, wherein the trained machine learning model receives, as input, user characteristic information of the corresponding user and the one or more elements automatically identified and provides, as output, the one or more hashtags, each of the one or more hashtags identifying at least a corresponding merchant for a corresponding one of the one or more elements detected in the media content;
embed the one or more hashtags within the media content;
publish the media content with the one or more hashtags for one or more remote users to interact with, the one or more remote users being different than the corresponding user that created the media content, wherein once published, a click on the media content visually places the one or more hashtags at an associated location of the corresponding one of the one or more elements inside the media content, each of which when selected, redirects a corresponding one of the one or more remote users to a merchant site of the corresponding merchant;
track interactions of the one or more remote users with the media content having the one or more hashtags embedded therein to yield a set of statistics, the interactions including at least viewing the media content, clicking on any of the one or more hashtags embedded within the media content, and purchasing a product on the merchant site of the corresponding merchant; and
one of generate or update a user-specific loyalty identifier for the corresponding user based on the set of statistics, the user-specific loyalty identifier being a cumulative measure of redeemable value of the corresponding user based on at least the interactions of the one or more remote users with the media content, the user-specific loyalty identifier being available as a computer-readable tag on the user device of the corresponding user for redemption.

17. The one or more non-transitory computer-readable media of claim 16, wherein the computer vision technique utilizes a corresponding trained machine learning model to detect the one or more elements.

18. The one or more non-transitory computer-readable media of claim 17, wherein the corresponding trained machine learning model uses at least information on historical trends of the corresponding user to automatically identify the associated metadata for each identified one of the one or more elements.

19. The one or more non-transitory computer-readable media of claim 16, wherein the computer-readable instructions, when executed by the one or more processors, further cause the one or more processors to track the interactions when at least one of the one or more remote users clicks on the media content or selects an embedded hashtag of the one or more hashtags within the media content.

20. The one or more non-transitory computer-readable media of claim 16, wherein the user-specific loyalty identifier is redeemable in a form of a cryptocurrency.

* * * * *